(12) United States Patent
Christensen

(10) Patent No.: US 7,093,617 B2
(45) Date of Patent: Aug. 22, 2006

(54) FLUIDIC DIVERTER VALVE WITH A NON-SPHERICAL SHUTTLE ELEMENT

(75) Inventor: Donald J. Christensen, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 136 days.

(21) Appl. No.: 11/043,227

(22) Filed: Jan. 25, 2005

(65) Prior Publication Data

US 2006/0000514 A1 Jan. 5, 2006

Related U.S. Application Data

(62) Division of application No. 10/337,133, filed on Jan. 6, 2003, now Pat. No. 6,926,036.

(51) Int. Cl.
*F16K 11/044* (2006.01)
(52) U.S. Cl. .................. 137/872; 137/831
(58) Field of Classification Search ............. 137/597, 137/869, 870, 872, 814, 831, 832
See application file for complete search history.

(56) References Cited

U.S. PATENT DOCUMENTS

| | | | |
|---|---|---|---|
| 3,053,276 A | 9/1962 | Woodward | |
| 3,486,517 A | 12/1969 | Gaura | |
| 3,500,853 A | 3/1970 | Freeman | |
| RE27,712 E | 7/1973 | Becker et al. | |
| 3,754,576 A | 8/1973 | Zetterstrom et al. | |
| 3,789,864 A | 2/1974 | Cowan et al. | |
| 4,150,811 A | 4/1979 | Condit | |
| 4,241,760 A | 12/1980 | Mon | |
| 4,278,110 A | 7/1981 | Price et al. | |
| 5,303,727 A | 4/1994 | Wilson et al. | |
| 5,406,981 A | 4/1995 | Frederick | |
| 5,820,103 A | 10/1998 | Nilsson et al. | |
| 5,927,335 A | 7/1999 | Christensen | |

*Primary Examiner*—John Fox
(74) *Attorney, Agent, or Firm*—Ingrassia Fisher & Lorenz

(57) ABSTRACT

A fluidic diverter valve for use in flight control systems that includes a non-spherical shuttle element disposed within a cavity formed in the valve housing. In one embodiment, the shuttle element has a disc-shaped main body with first and second sides that are substantially flat and extend substantially parallel to one another, and a substantially symmetrically shaped peripheral section located between the first and second sides.

6 Claims, 4 Drawing Sheets

FLUIDIC DIVERTER VALVE WITH A NON-SPHERICAL SHUTTLE ELEMENT

CROSS REFERENCE TO RELATED APPLICATION

This application is a divisional of Ser. No. 10/337,133 filed on Jan. 6, 2003, now U.S. Pat. No. 6,926,036.

FIELD OF THE INVENTION

The present invention relates to hot gas fluidic diverter valves used in missile and spacecraft propulsion systems and, more particularly, to a hot gas fluidic diverter valve that incorporates a non-spherical shuttle element.

BACKGROUND OF THE INVENTION

The movements involved in flight of some missiles and space vehicles, such as pitch, yaw, and spin rate, are controlled with flight control systems that use reaction jets. In some systems of this type, a pressurized gas source, such as a gas generator, supplies a pressurized gas to one or more fluidic amplifier stages. In response to a control signal supplied from flight control equipment, a fluidic amplifier stage can selectively divert the pressurized gas into one of two or more flow paths. Each flow path may have a nozzle on its outlet that is located external to the missile or vehicle. These nozzles may be positioned to provide thrust in different or opposite directions. Thus, the fluidic amplifier stages can affect one or more flight parameters by selectively diverting the pressurized gas to selected outlet nozzles.

The fluidic amplifier stages incorporated into the above-described flight control system can include non-vented fluidic amplifiers, which are generally known in the art. However, non-vented fluidic amplifiers may not provide 100% flow diversion. Thus, some systems incorporate an additional fluidic element, such as a fluidic diverter valve, between the final fluidic amplifier stage and the output nozzles, which allows the system to substantially achieve 100% flow diversion.

One particular type of fluidic diverter valve uses a spherically shaped ball shuttle element. The ball element is solid, and is located in a chamber formed in the valve housing. The housing includes an inlet port and two outlet ports. The ball element is moveable within the chamber and selectively blocks one of the two ports so that pressurized gas entering the inlet port is selectively directed out the port that is not blocked.

Although the above-described type of fluidic diverter valve is robustly designed and manufactured, and operates safely, it suffers certain drawbacks. For example, it can be fairly complex, costly, and some of the materials that may be used to make the ball may not be sufficiently robust. In particular, the ball may erode in the flow of pressurized gas. In addition, the size and weight of the ball should be selected to maximize valve performance. However, some of the materials that may be used in a high temperature environment may be weight prohibitive for use as a solid ball. Alternatively, some materials that are not weight prohibitive may erode in the gas flow and/or the materials may be costly.

Hence there is a need for a fluidic diverter valve that addresses one or more of the above-noted drawbacks. Namely, a hot gas fluidic diverter valve having a shuttle element that is not complex and/or costly, and/or is structurally robust. The present invention addresses one or more of these needs.

SUMMARY OF THE INVENTION

The present invention provides a hot gas fluidic diverter valve with a non-spherical shuttle element. The non-spherical shuttle element is lightweight, provides increased reproducibility, is more robust, and/or exhibits more predictable strength margins, as compared to a spherical shuttle element.

In one embodiment, and by way of example only, a hot gas fluidic diverter valve includes a housing, first and second fluid inlet ports, first and second fluid outlet ports, and a non-spherical shuttle element. The housing has a shuttle element cavity formed therein. The first and second fluid inlet ports each extend through the housing and are each in fluid communication with the shuttle element cavity. The first and second fluid outlet ports each extend through the housing and are each in fluid communication with the shuttle element cavity. The non-spherical shuttle element is freely disposed within the shuttle element cavity and is translationally moveable in response to hot gas flow through the inlet ports to selectively move between at least a first position and a second position. In the first position the shuttle element substantially seals the first fluid outlet port and in the second position the shuttle element substantially seals the second fluid outlet port.

In another exemplary embodiment, a flow control device for use with a gas generator having a pressure vessel and providing a combustion gas output includes a fluidic amplifier and a fluidic diverter valve. The fluidic amplifier has a fluid inlet port and at least two fluid outlet ports. The fluidic amplifier fluid inlet port is adapted to receive pressurized fluid from the gas generator pressure vessel. The fluidic diverter valve includes a housing and a non-spherical shuttle element. The housing has a shuttle element cavity formed therein, which is in fluid communication with two of the fluidic amplifier fluid outlet ports. The non-spherical shuttle element is freely disposed within the shuttle element cavity and is translationally moveable in response to hot pressurized fluid flow through the inlets to move between at least a first position and a second position.

In still another exemplary embodiment, a shuttle element for placement in a hot gas fluidic diverter valve housing includes a main body having a first side, a second side, and a peripheral edge located between at least peripheral edges of the first and second sides. The first and second sides are substantially flat and substantially parallel to one another, and the peripheral edge is substantially symmetrically curved.

In still a further exemplary embodiment, a flight control system includes a controller, a hot gas generator, one or more fluidic amplifier stages, at least two discharge nozzles, and a hot gas fluidic diverter valve. The controller is operable to supply flight control signals. The hot gas generator is operable to supply a flow of hot pressurized gas. Each of the fluidic amplifier stages is coupled to receive the flow of hot pressurized gas from the gas generator and each is responsive to the flight control signals to selectively divert at least a portion of the received flow of hot pressurized gas into one of at least two amplifier stage outlet ports. The hot gas fluidic diverter valve includes a housing, first and second fluid inlet ports, first and second fluid outlet ports, and a non-spherical shuttle element. The housing has a shuttle element cavity formed therein. The first and second fluid inlet ports each extend through the housing and are each in fluid communication with the shuttle element cavity. The first and second fluid outlet ports each extend through the housing and each couple one of the discharge nozzles in fluid communication with the shuttle element cavity. The non-spherical shuttle element is freely disposed within the shuttle element cavity and is translationally moveable in response to hot pressurized gas flow through the inlet ports to selectively move between at least a first position and a second position. In the first position the shuttle element substantially seals the first fluid outlet port and in the second position the shuttle element substantially seals the second fluid outlet port.

Other independent features and advantages of the preferred fluidic diverter valve will become apparent from the following detailed description, taken in conjunction with the accompanying drawings which illustrate, by way of example, the principles of the invention.

DETAILED DESCRIPTION OF A PREFERRED EMBODIMENT

Figure 1:
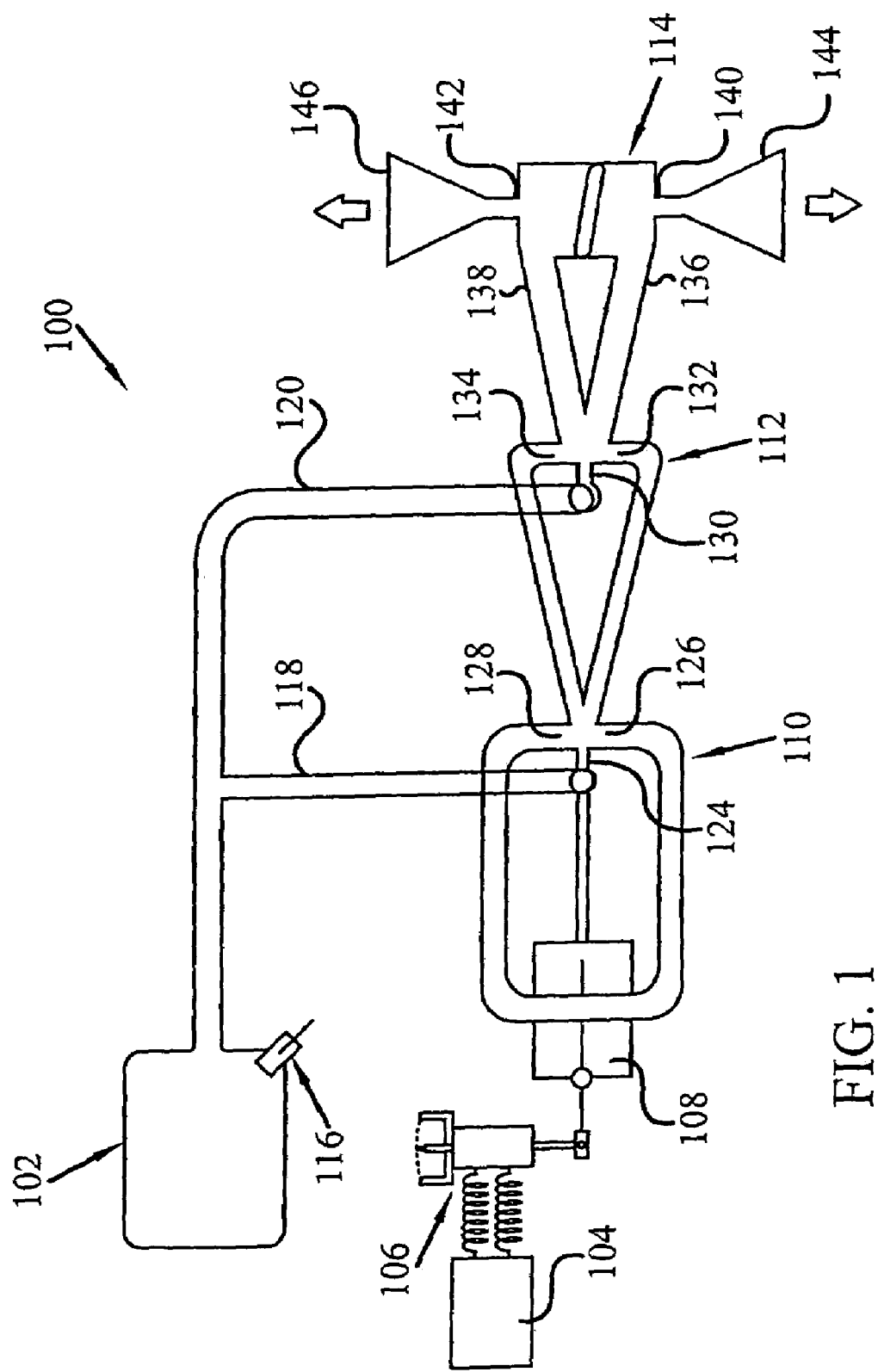
FIG. 1 is a simplified schematic diagram of an exemplary flight control system that may use an embodiment of the present invention.

A simplified schematic diagram of at least a portion of an exemplary flight control system 100 that may use an embodiment of the present invention is illustrated in FIG. 1. The system 100 includes a gas generator 102, a flight controller 104, a solenoid valve 106, a pilot valve 108, a first stage fluidic amplifier 110, a second state fluidic amplifier 112, and a fluidic diverter valve 114. The gas generator 102 includes an initiator 116 that, during a vehicle launch sequence or at some point during vehicle flight, activates the gas generator 102. The gas generator 102, upon activation, supplies a flow of high pressure, high temperature gas to one or more gas flow paths. In the depicted embodiment, a first gas flow path 118 is fluidly coupled to the first stage fluidic amplifier 110 and to the pilot valve 108, and a second gas flow path 120 is fluidly coupled to the second stage fluidic amplifier 112.

The first 110 and second 112 stage fluidic amplifiers are each preferably non-vented fluidic bistable amplifiers. The first stage fluidic amplifier 110 includes a primary gas flow path 124, and two control gas flow paths, namely a first control gas flow path 126 and a second control gas flow path 128. Similarly, the second stage fluidic amplifier 112 includes a primary gas flow path 130, a first control gas flow path 132, and a second control gas flow path 134. The second stage fluidic amplifier 112 additionally includes two outlet ports, a first fluid outlet port 136 and a second fluid outlet port 138.

The first stage fluidic amplifier primary gas flow path 124 is in fluid communication with the first gas flow path 118 from the gas generator 102, and the second stage fluidic amplifier primary gas flow path 130 is in fluid communication with the second gas flow path 120 from the gas generator 102. The first stage fluidic amplifier first 126 and second 128 control gas flow paths are in fluid communication with the pilot valve 108, and the second stage fluidic amplifier first 132 and second 134 control gas flow paths are in fluid communication with the first stage fluidic amplifier primary 124 gas flow path 124 and the first 126 and second 128 control gas flow paths. The second stage fluidic ampli-fier first 136 and second 138 fluid outlet ports are in fluid communication with the fluidic diverter valve 114.

Figure 2:
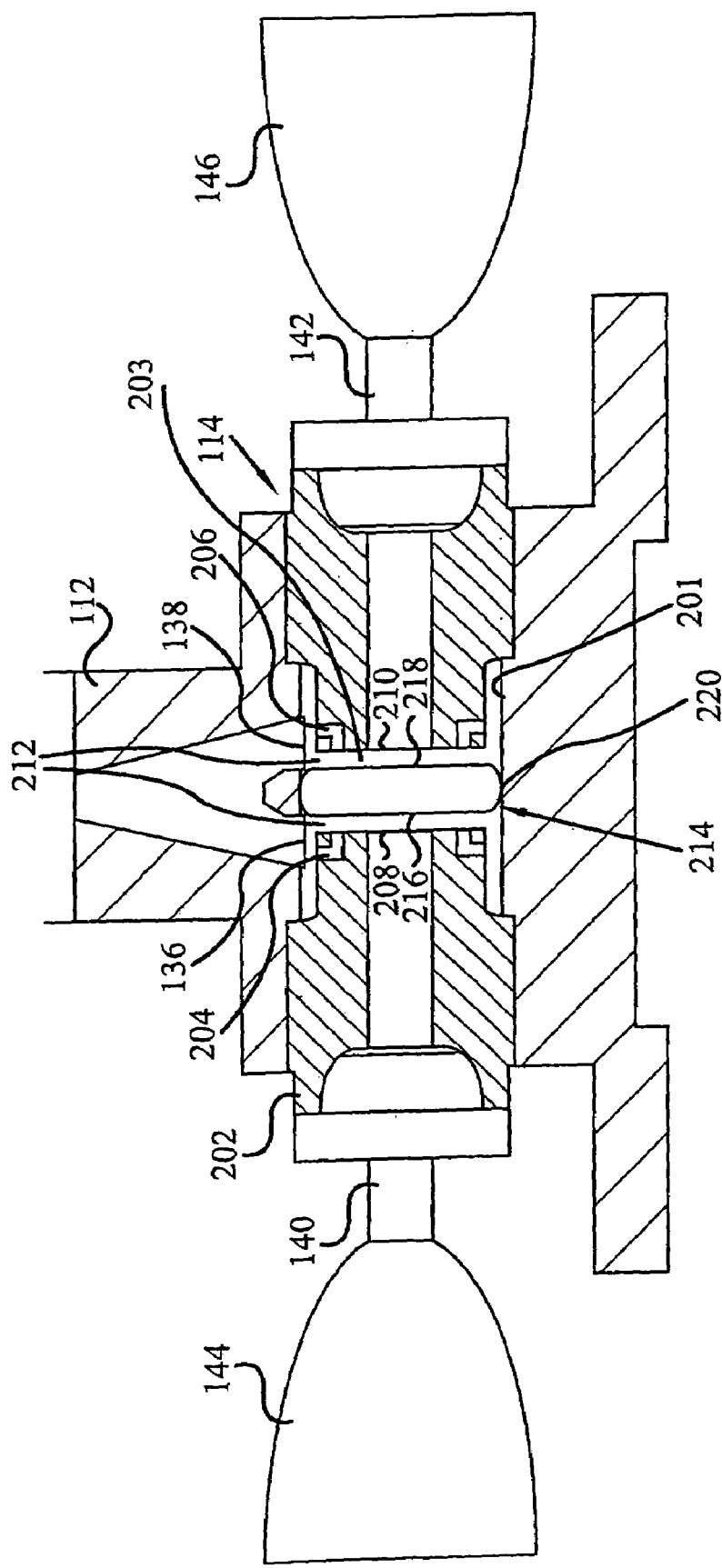
FIGS. 2–4 are cross section views of a portion of the flight control system of FIG. 1, showing exemplary fluidic diverter valves according to various embodiments of the present invention.

The fluidic diverter valve 114, one embodiment of which is shown in cross section in FIG. 2, is mounted to the second stage fluidic amplifier 112. In the depicted embodiment, the fluidic diverter valve 114 is mounted within the second stage fluidic amplifier 112, though it will be appreciated that the fluidic diverter valve 114 could be mounted on the second stage fluidic amplifier 112. As FIGS. 1 and 2 illustrate, the fluidic diverter valve 114 includes a housing 202, at least two fluid inlet ports, a first fluid inlet port 204 and a second fluid inlet port 206, and at least two fluid outlet ports, a first fluid outlet port 208 and a second fluid outlet port 210. The housing 202 may be formed from two or more separate sections or as an integral piece. In either case, a shuttle element cavity 212 is formed in the housing 202, and a shuttle element 214 is freely disposed within the cavity 212.

The shuttle element 214 is non-spherical in shape and is translationally moveable within the cavity 212 between the first 208 and second 210 fluid outlet ports. The shuttle element 214 includes a first side 216, a second side 218, and a peripheral section 220. The first 216 and second 218 sides are substantially flat, substantially circular in cross section, and extend parallel to one another. The peripheral section 220 is located between the first 216 and second 218 sides, and is formed substantially symmetrically with respect to the first 216 and second 218 sides. In the depicted embodiment, the peripheral section 220 is substantially semi-circular in cross sectional shape, though it will be appreciated that the peripheral section 220 is not limited to this shape and could be flat or otherwise shaped as needed in a particular application. In the depicted embodiment, the shuttle element peripheral section 220 extends through the housing 202 and slidingly contacts a surface 201 in the second stage fluidic amplifier 112. It will be appreciated that this is merely exemplary of a particular preferred embodiment, and that the shuttle element 214 could also be disposed within the cavity 212 in a non-contact configuration with the second stage fluidic amplifier 112. It will be appreciated that the shape of the shuttle element 214 may vary depending on various other conditions and/or component configurations such as, for example, the configuration of the first 208 and second 210 outlet ports that are to be blocked, as described below, by the shuttle element 214.

The fluidic diverter valve first 204 and second 206 fluid inlet ports and first 208 and second 210 fluid outlet ports each extend through the housing 202, and are each in fluid communication with the cavity 212. The diverter valve first 204 and second 206 fluid inlet ports are also in fluid communication with the second stage fluidic amplifier first 136 and second 138 fluid outlet ports, respectively. In addition, the diverter valve first 208 and second 210 fluid outlet ports are in fluid communication with first 140 and second 142 blast tubes, respectively, which are each in fluid communication with first 144 and second 146 thrust nozzles, respectively. Thus, as will be described more fully below, the shuttle element 214 is positioned by controlling the flow of fluid such as, for example, hot pressurized gas, through the second stage fluidic amplifier first 136 and second 138 fluid outlet ports.

Referring now to FIGS. 1 and 2 in combination, operation of the flight control system 100 is controlled by the flight controller 104. During vehicle flight, the flight controller 104 supplies control signals to the solenoid valve 106, which in turn causes the pilot valve 108 to divert a portion of the gas flowing in the first flow path 118 into one of the first stage fluidic amplifier control gas flow paths 126 or 128.

This causes the gas flowing through the first stage fluidic amplifier primary gas flow path 124 to be directed into one of the second stage fluidic amplifier control gas flow paths 132 or 134. This in turn causes the gas flowing through the second stage fluidic amplifier primary gas flow path 130, which is received from the gas generator second gas flow path 120, to be directed into one of the second stage fluidic amplifier outlet ports 136 or 138. As a result, gas flowing through the second stage fluidic amplifier outlet ports 136 or 138 will enter one of the fluidic diverter valve fluid inlet ports 204 or 206. This will cause the shuttle element 214 to move away from one of the diverter valve fluid outlet ports 208 or 210, and allow gas to flow through it to one of the thrust nozzles 144 or 146. At the same time, the shuttle element 214 will be moved toward the other fluid outlet port 210 or 208, sealing it and the other thrust nozzle 146 or 144 from the gas flow.

For example, if it is desired to exhaust gas out the first thrust nozzle 144, the flight controller 104 will supply a control signal to solenoid valve 106 that will cause the pilot valve 108 to divert gas flow into the first stage fluidic amplifier first control gas flow path 126. This will direct the gas flowing through the first stage fluidic amplifier primary gas flow path 124 into the second stage fluidic amplifier second control gas flow path 134, which will in turn direct the gas flowing through the second stage fluidic amplifier primary gas flow path 130 into the second stage fluidic amplifier first outlet port 136. The gas then flows through the second stage fluidic amplifier first fluid outlet port 136, and into the fluidic diverter valve first fluid inlet port 204. As a result, the gas flow will move the shuttle element 214 away from the fluidic diverter valve first outlet port 208 and toward the fluidic diverter valve second fluid outlet port 210. This will allow pressurized gas to flow out the diverter valve first outlet port 208, and will seal the diverter valve second outlet port 210. Thus, pressurized gas flows through the first thrust nozzle 144, while sealing the second thrust nozzle 146 against the gas flow.

Figure 3:
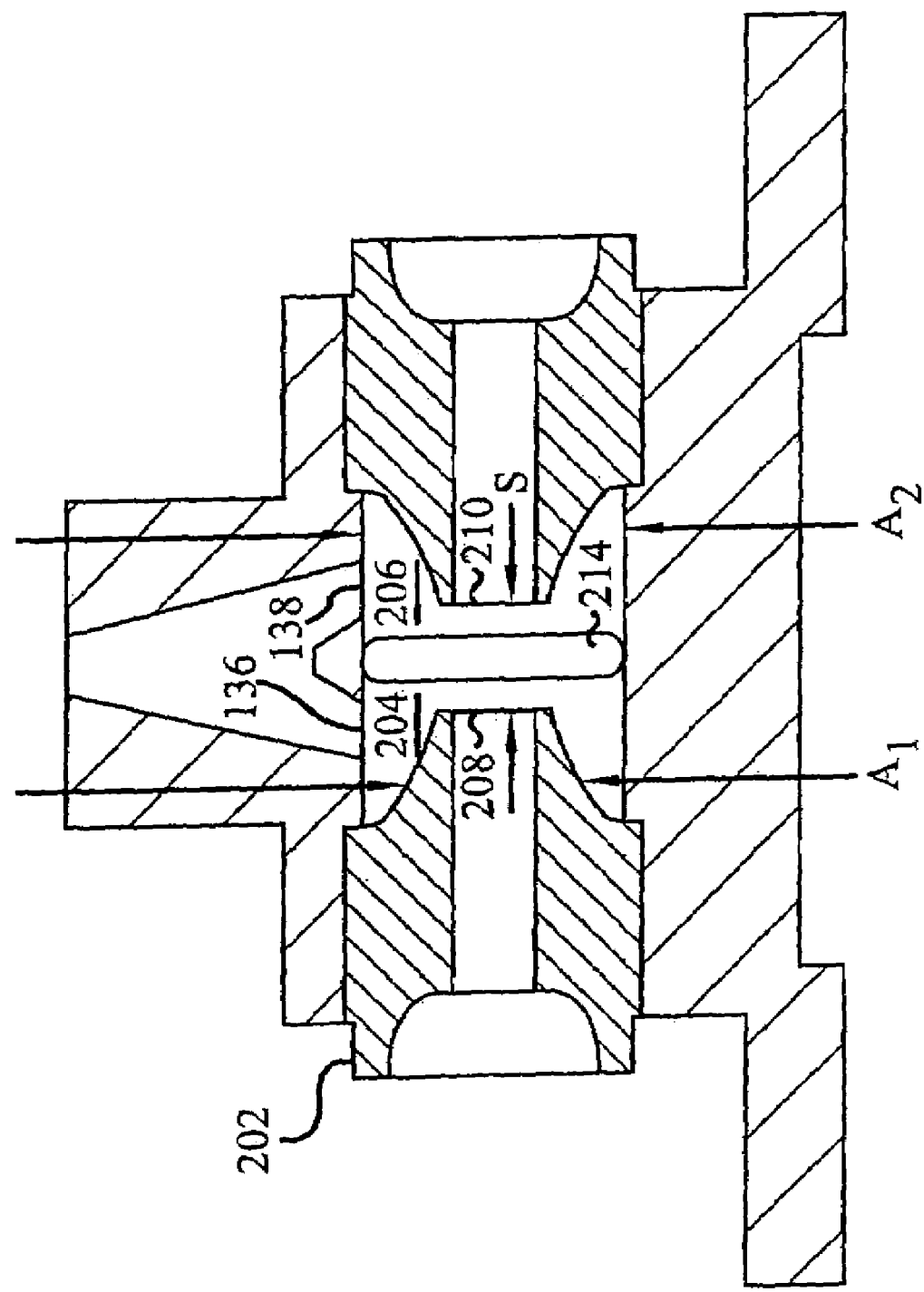
Figure 4:
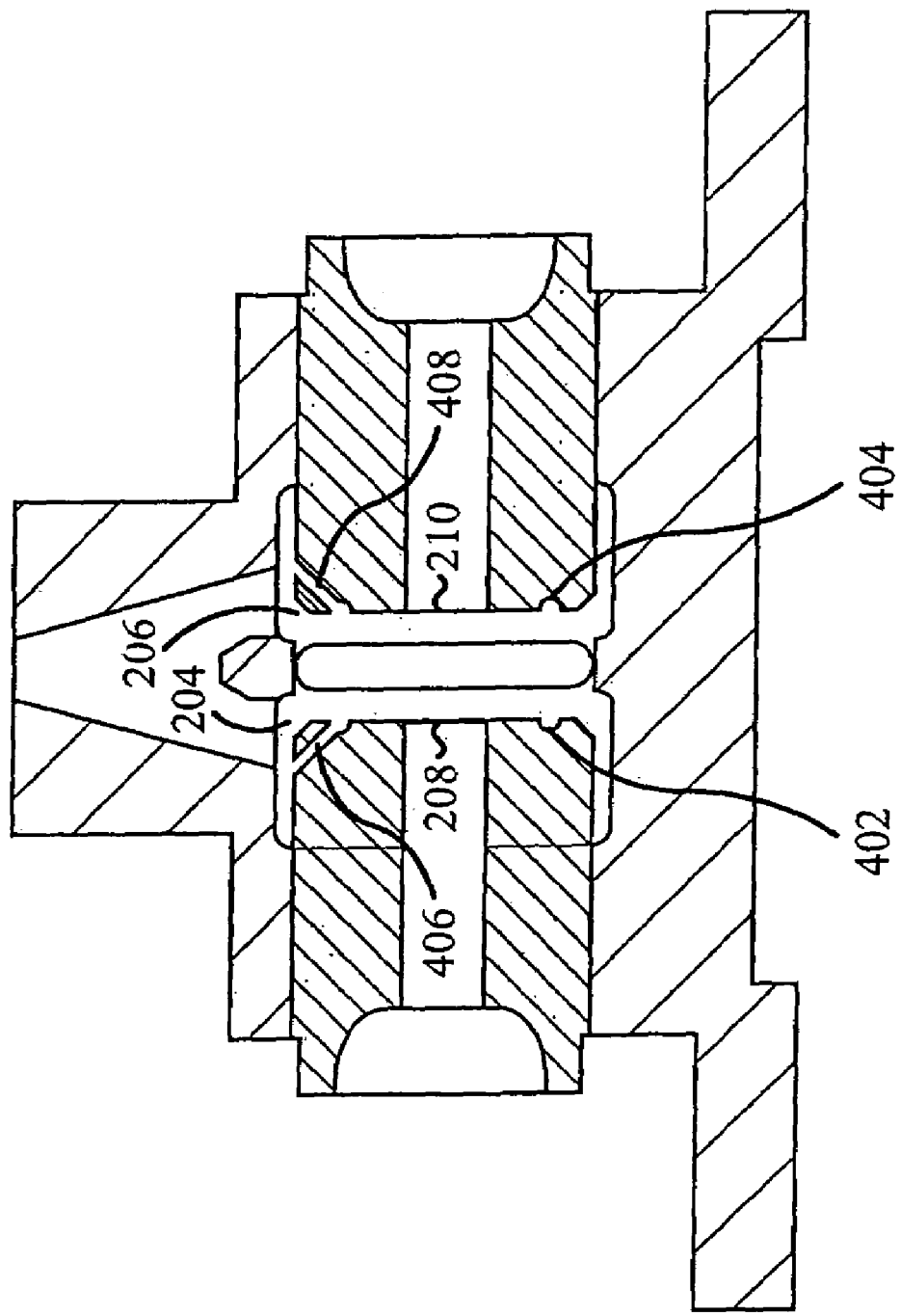

The housing 202 and shuttle element cavity 212 configuration depicted in FIG. 2 is merely exemplary of one embodiment. Other exemplary configurations, such as those illustrated in FIGS. 3 and 4, in which like reference numerals refer to like components of FIG. 2, may also be used. In any configuration that is used, the areas A1, A2, which are explicitly shown in FIG. 3, and more particularly the area ratio A2/A1, in combination with the shuttle element stroke S, and the unobstructed supply flow area to the valve open side, are selected so that proper switching of the shuttle element 214 will occur. It will be appreciated that in the embodiment shown in FIG. 4, the housing includes at least two annular grooves, namely a first annular groove 402 and a second annular groove 404. At least two bleed holes, a first 406 bleed hole and a second 408 bleed hole, extend between the first 402 and second 404 annular grooves and the first fluidic diverter valve first 204 and second 206 fluid inlet ports, respectively, and allow fluid pressure to be communicated to and/or from the first 402 and second 404 annular grooves. It will be appreciated that the dimensions of the first 402 and second 404 annular grooves define the area A1. It will additionally be appreciated that with the exemplary configuration of FIG. 4, additional structural supporting area for the shuttle element 214 is provided, which may improve the fluidic diverter valve's ability to withstand the impact of the shuttle element 214 during switching events.

The fluidic diverter valve 114 may be constructed of any one of numerous materials that are capable of withstanding the high temperature output of the gas generator 102, and the specific materials used may depend on the temperature of the gas supplied by the gas generator 102. For example, when the flight control system 100 need only supply relatively "warm" gas (e.g., ≦2000° F.) for relatively short flight profiles (e.g., <1 second), stainless steel may be used for the housing 202 and other non-moving parts of the diverter valve 114. For longer flight profiles, or hotter gas temperatures, the housing 202 and other non-moving parts are preferably constructed of Inconel, ceramic, or TZM (Titanium Zirconium Molybdenum). When the flight control system supplies gas at temperatures in the range of 3700° F., exotic materials such as, for example, rhenium, are preferred because of the high temperature strength and diffusion bonding capability such exotic materials exhibit. Conventional machining operations such as, for example, plunge EDM are suitable for forming the housing 202 and other non-moving parts.

The shuttle element 214 may also be constructed of any one of numerous materials that are capable of withstanding the high temperature output of the gas generator 102. In a particular preferred embodiment for warm gas applications, the shuttle element 214 is formed of a pure silicon nitride. For higher temperature applications, the shuttle element 214 is formed of a ceramic or graphite material, and is then coated with a layer of rhenium by, for example, a chemical vapor deposition (CVD) process.

The fluidic diverter valve 114 includes a non-spherical shuttle element 214 that is lightweight, provides increased reproducibility, is more robust, and exhibits more predictable strength margins, as compared to other fluidic diverter valve designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A flow control device for use with a hot gas generator having a pressure vessel and providing a combustion gas output, the flow control device comprising:
   a fluidic amplifier having a fluid inlet port and at least two fluid outlet ports, the fluid inlet adapted to receive hot pressurized fluid from the gas generator pressure vessel; and
   a fluidic diverter valve including:
      a housing having a first fluid inlet port, a second fluid inlet port, a first fluid outlet port, a second fluid outlet port, and a shuttle element cavity formed therein, the first fluid inlet port coupling a first one of the fluidic amplifier fluid outlets in fluid communication with the shuttle element cavity, the second fluid inlet port coupling a second one of the fluidic amplifier fluid outlets in fluid communication with the shuttle element cavity, the first and second fluid outlet ports each in fluid communication with the shuttle element cavity, and
      a non-spherical shuttle element freely disposed within the shuttle element cavity, the shuttle element including a main body having substantially flat first and second sides disposed substantially parallel to one another, and a substantially symmetrically shaped peripheral section located between the first and second sides, the shuttle element translationally moveable in response to hot pressurized fluid flow through the inlet ports to move between at least a first position and a second position, wherein at least a portion of the shuttle element first side substantially seals the first fluid outlet port in the first position, and at least a portion of the shuttle element second side substantially seals the second fluid outlet port in the second position.

2. The device of claim 1, wherein the shuttle element is substantially disc-shaped.

3. The device of claim 1, wherein the housing comprises a metal selected from the group consisting of Inconel, ceramic, and Titanium Zirconium Molybdenum.

4. The device of claim 3, wherein the housing further comprises rhenium.

5. The device of claim 4, wherein the shuttle element comprises silicon nitride.

6. The device of claim 1, wherein the shuttle element comprises graphite coated with a layer of rhenium.

* * * * *